US008270629B2

United States Patent
Bothra et al.

(10) Patent No.: US 8,270,629 B2
(45) Date of Patent: Sep. 18, 2012

(54) SYSTEM AND METHOD ALLOWING FOR SAFE USE OF A HEADSET

(75) Inventors: Subhas Bothra, Fremont, CA (US); Louis Pandula, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1053 days.

(21) Appl. No.: 11/256,166

(22) Filed: Oct. 24, 2005

(65) Prior Publication Data

US 2007/0092087 A1    Apr. 26, 2007

(51) Int. Cl.
    *H04R 1/10* (2006.01)
(52) U.S. Cl. ............. 381/74; 381/56; 381/57; 381/370; 381/309
(58) Field of Classification Search .............. 381/309, 381/74, 71.6, 86, 370, 80–81, 56–57
    See application file for complete search history.

(56) References Cited

U.S. PATENT DOCUMENTS

| 4,754,486 A * | 6/1988 | Stafford et al. ............ 381/86 |
| 5,093,658 A * | 3/1992 | Grothause ............ 455/73 |
| 5,706,357 A * | 1/1998 | Yang ............ 381/107 |
| 6,957,134 B2 * | 10/2005 | Ramseyer et al. ............ 701/32.8 |
| 7,251,334 B1 * | 7/2007 | Sundberg ............ 381/56 |
| 7,292,880 B2 * | 11/2007 | Lehtonen ............ 455/569.1 |
| 7,356,151 B2 * | 4/2008 | Seknicka ............ 381/113 |
| 7,469,051 B2 * | 12/2008 | Sapashe et al. ............ 381/104 |
| 7,684,571 B2 * | 3/2010 | Grosvenor et al. ............ 381/92 |
| 2002/0150262 A1 * | 10/2002 | Carter ............ 381/86 |
| 2003/0179892 A1 * | 9/2003 | Madsen ............ 381/120 |
| 2006/0083388 A1 * | 4/2006 | Rothschild ............ 381/81 |

\* cited by examiner

*Primary Examiner* — Goins Davetta
*Assistant Examiner* — Disler Paul
(74) *Attorney, Agent, or Firm* — Sterne, Kessler, Goldstein & Fox PLLC (57) ABSTRACT

A system and method allow for safe use of headphones that include a microphone when using the headphones with a cellular phone, a music device, or the like. A desired audio signal, e.g., a voice of a caller or music, is discontinued when a microphone associated with the headphones picks up either a change in ambient noise or a particular type of ambient noise, e.g., an ambulance, a police car, a fire truck, someone yelling, brakes squealing, or the like. During this state, the headphones output either an audible alert signal, the ambient noise, or a pre-stored signal that states "fire," "police,", "yelling," etc. In this way, a person can safely talk on the phone or listen to music when walking or driving, while still being cognizant of what is going on around them.

24 Claims, 6 Drawing Sheets

SYSTEM AND METHOD ALLOWING FOR SAFE USE OF A HEADSET

BACKGROUND

1. Field

The present invention is related to safely using headphones.

2. Related Art

The use of headphones (e.g., Bluetooth or the like headphones with a microphone) by operators of motorized vehicles, bicyclers, walkers, runners, and the like has increased as technology has allowed for telephone conversations to be conducted while performing one of the above tasks. However, while concentrating on listening and/or talking the user can become easily distracted from what is going on around him or her. This is also true when the headphones are used to listen to music or other audio file. This can lead to dangerous or undesirable situations if an emergency vehicle is near them, a crash happens around them, a person is trying to get their attention, or the like.

Therefore, what is needed is a system and method that can allow for a user to become aware of an event occurring around them when they are listening to and/or talking into headphones.

BRIEF DESCRIPTION OF THE DRAWINGS/FIGURES

The accompanying drawings, which are incorporated herein and form a part of the specification, illustrate one or more embodiments of the present invention and, together with the description, further serve to explain the principles of the invention and to enable a person skilled in the pertinent art to make and use the invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

One embodiment of the present invention provides a system and method that allows for safe use of headphones that include a microphone when using the headphones with a cellular phone, a music device, or the like. A desired audio signal, e.g., a voice of a caller or music, is discontinued when a microphone associated with the headphones picks up either a change in ambient noise or a particular type of ambient noise, e.g., an ambulance, a police car, a fire truck, someone yelling, brakes squealing, or the like. During this state, the headphones output either an audible alert signal, the ambient noise, or a pre-stored signal that states "fire," "police,", "yelling," etc. In this way, a person can safely talk on the phone or listen to music when walking or driving, while still being cognizant of what is going on around them.

One embodiment of the present invention provides a system comprising first and second drivers, a receiver, an analog system, and a digital system. The first and second drivers drive respective first and second output devices, such that first information is transmitted to the first and second output devices during a first mode and second information is transmitted to the first and second output devices during a second mode. The receiver continuously receives environmental audio information. The analog system receives a first signal corresponding to the audio information from the receiver. The digital system receives a second signal corresponding to the audio information from the analog system, determines if an event has occurred based on the signal, and generates a third signal. The analog system controls transmission of the first information or the second information based on the third signal being received from the digital system.

Another embodiment of the present invention provides a method including the following steps. Continuously monitoring ambient noise proximate headphones worn by a user. Monitoring for one of a predetermined level of change in the ambient noise and a predetermined kind of the ambient noise between previous and present time periods. Changing a type of signal received at the headphones based on the monitoring steps.

A further embodiment of the present invention provides a method comprising the following steps. Outputting a first type of audio signal through headphones worn by a user when ambient noise proximate the headphones remains below a threshold level. Continuously monitoring the ambient noise. Determining when the ambient noise one of exceeds the threshold level or matches a predetermined value corresponding to a predetermined event. Temporarily outputting a second type of audio signal through the headphones during the exceeding of the threshold or the matching of the predetermined value. Returning to the outputting step when the ambient noise returns to below the threshold level or fails to match the predetermined value.

Exemplary Overall System

Figure 1:
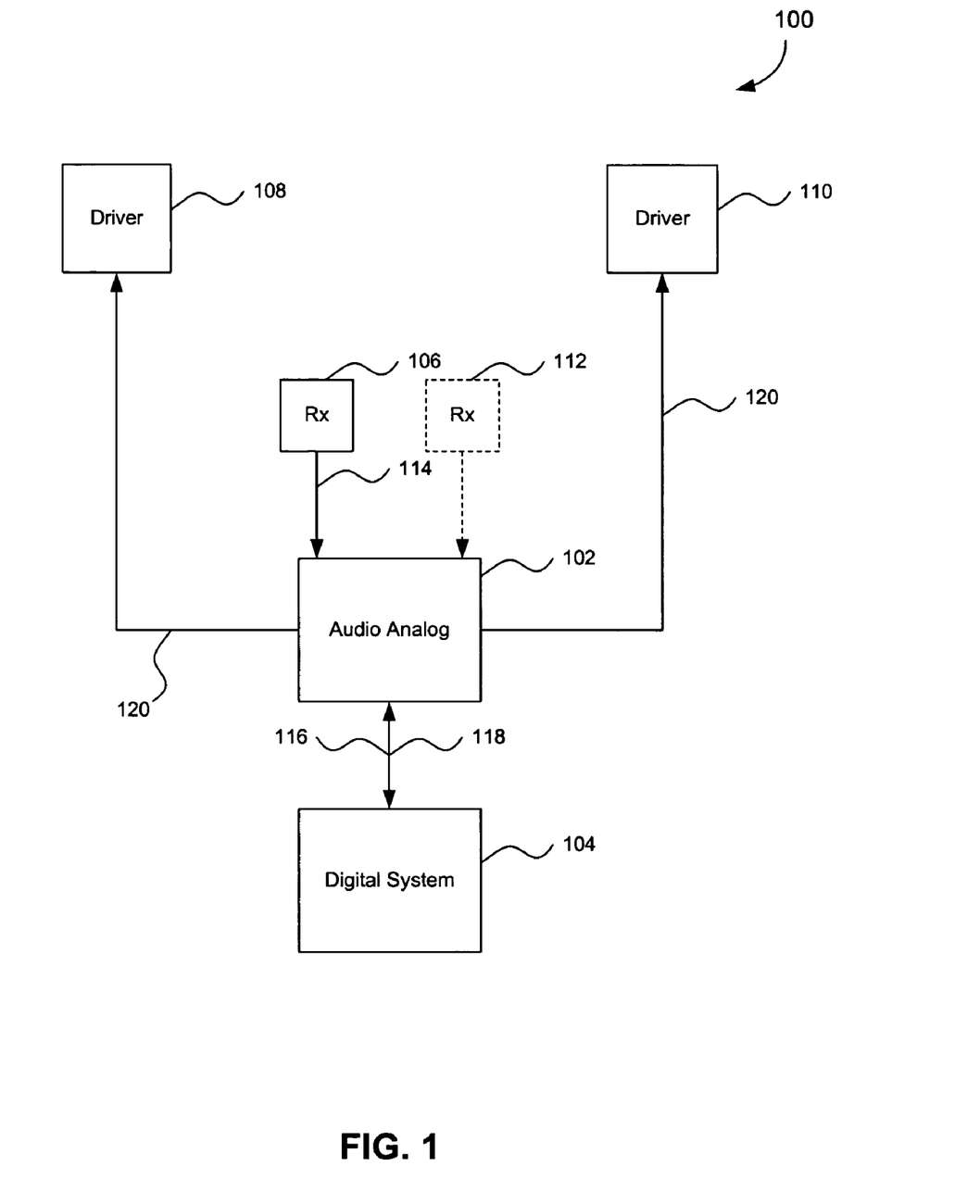
FIG. 1 shows a system, according to one embodiment of the present invention.

FIG. 1 shows a system 100, according to a first embodiment of the present invention. System 100 includes an analog system 102, a digital system 104, a receiver 106, and two drivers 108 and 110.

It is to be appreciated that analog and digital systems 102 and 104 can be on a single chip or each can be on respective separate chips.

In a second embodiment of the present invention, system 100 includes a second receiver 112. This can be done when first receiver 106 is a very high quality, high power receiver, and a limited power supply is used to power system 100. In this case, second receiver 112 would be relatively low power device. In one example, second receiver 112 can require about a factor of 10 reduction in power, e.g., about 2-3 mA for first receiver 106 compared to about 100 µA for second receiver 112.

For example, second receiver 112 could be continuously ON when system 100 is operating, while first receiver 106 is only turned ON when first receiver 106 is in use. When first receiver 106 is not in used, first receiver 106 is placed in sleep mode. In one example, first receiver 106 can be voice activated and only operate when a user talks into it. In this way, overall required power to operate system 100 can be substantially reduced.

In the first embodiment, one or both of a voice of a user or ambient noise is detected by receiver 106, which generates a first signal 114 therefrom. First signal 114 is received at analog system 102, which processes first signal 114 to produce a second signal 116. Second signal 116 is received at digital system 104, which processes second signal 116 to produce a third signal 118. Third signal 118 is received at analog system 102, which processes third signal 118 to produce a fourth signal 120. Fourth signal 120 is received at drivers 108 and 110 and is used by analog system 102 to allow drivers 108 and 110 to operate in either a first mode or a second mode.

For example, in one environment system 100 is a headphone system of a cellular telecommunications system having earphones (not shown) driven by drivers 108 and 110 and a microphone functioning as receiver 106. In this example, the first mode can be a default normal operation mode, where the user is talking on the phone, and a second mode of operation can be an alert mode alerting the user of a change in the ambient noise. In one example, the ambient noise would be transmitted to the earphones, while in another example a general or specific alarm type signal or indication name (e.g., it car output pre-stored audio voice signals like "fire," "police," "ambulance," "car braking," "person yelling," or the like) alerting the user to what has occurred around them would be transmitted to the earphones (e.g., a siren, someone yelling, a loud bang, etc.).

In another example, this might occur if the user is listening to music or an audio file, such that the music is stopped or the audio file is stopped when an event is occurring around the user, and then the user can receive the ambient noise, alarm, or indication signal.

The triggering of the second mode can occur in several ways, as is discussed in more detail below, for example with reference to FIG. 3.

Exemplary Analog System

Figure 2:
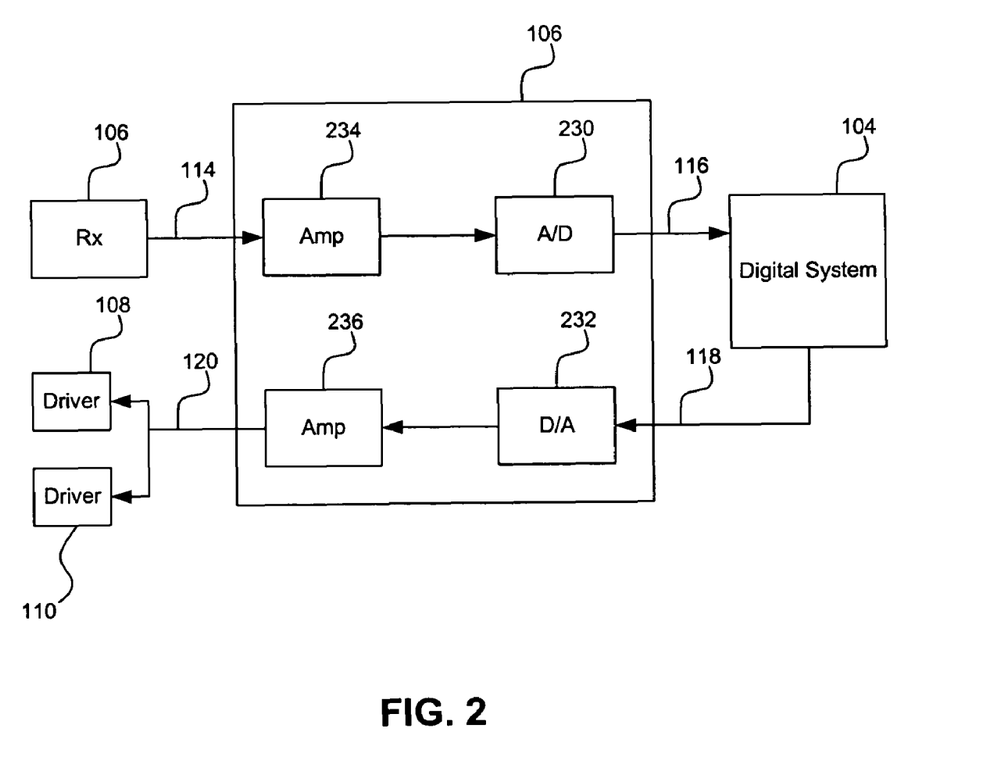
FIG. 2 shows an analog system, according to one embodiment of the present invention.

FIG. 2 shows details of analog system 102, according to one embodiment of the present invention. Analog system 102 includes at least an analog-to-digital (A/D) converter 230 and a digital-to-analog converter 232. In this embodiment, first signal 114 is an analog signal that is converted to a digital signal as second signal 116 using analog-to-digital (A/D) converter 230 to form digital second signal 116. Second signal 116 is received at digital system 104. Digital system 104 processes second signal 116 to form a digital signal as third signal 118. Third signal 118 is converted to an analog signal as fourth signal 118 using digital-to-analog (D/A) converter 232. In some cases, signals 114 and/or 118 need to be amplified, and in these cases amplifiers 234 and 236 can be used.

Exemplary Digital System

Figure 3:
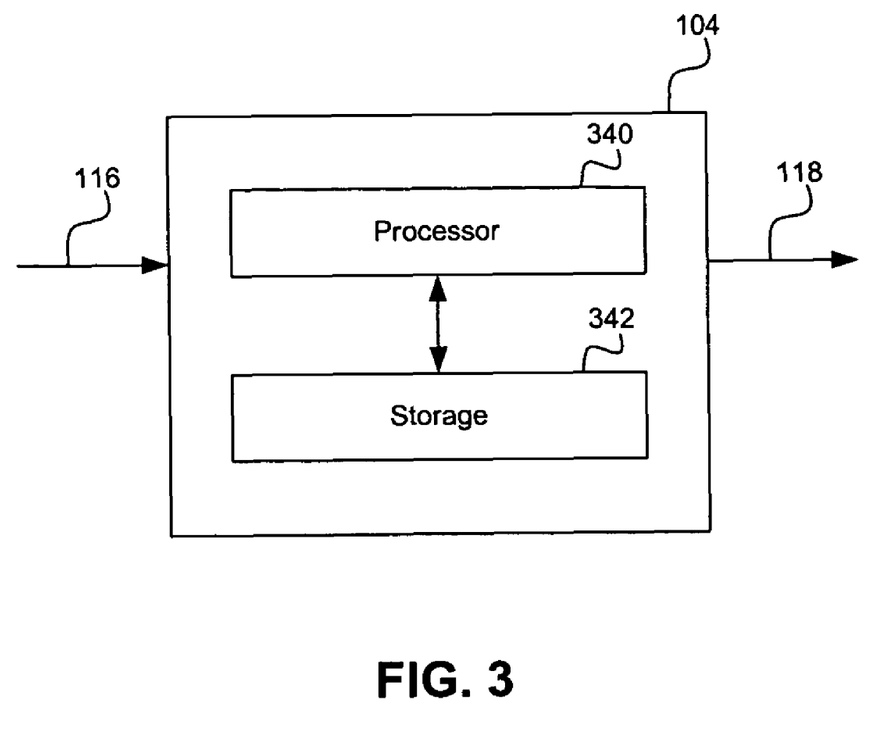
FIG. 3 shows a digital system, according to one embodiment of the present invention.

FIG. 3, shows digital system 104, according to one embodiment of the present invention. Digital system 104 includes a processor 340 and a storage device 342. Processor 340 can be at least one of, but is not limited to, a microprocessor, a digital signal processor, a RISC processor, and ARM processor, or the like. Processor 340 receives digital second signal 116 and compares it to either a previously received signal that is stored in storage 342 or to a previously stored event signal that is stored in storage 342. For example, a comparison is made with a previous signal to determine whether this is a change that is out of the ordinary. This can be a comparison based on frequency or decibel of second signal 116, or any other characteristic of second signal 116. Third signal 118 is a result signal based on this comparison. The result signal 118 is used to either leave system 100 operating in default (e.g., normal) mode or initiate the second mode (e.g., alert) mode. This is done, as described above, using analog system 102 after it receives and processes third signal 118 to generate fourth signal 120, which is used to control drivers 108 and 110.

It is to be appreciated that processor 340 can process signal 116 based on using one or more algorithms that are designed to allow for the functionally discussed above.

In various examples, the stored previous received signal can be either continuously replaced with incoming present second signals, permanently stored previous second signals, or temporarily stored previous second signals.

In various examples, the previously stored event signal can be a known decibel or frequency value corresponding to a specific event, such as an emergency vehicle (e.g., police car, ambulance, fire truck, etc.), a person talking or screaming, typical road noise (e.g., going over bumps) or unusual road noise (e.g., a tire blowing out), coins clinging in a persons pocket, etc. In other cases, the previously stored event signal can be a value that represents a known difference value between a predetermined benchmark ambient noise level and a presently received ambient noise level indicating that the specific event is occurring. Thus, in the various examples, the processor 340, possibly using an algorithm, can distinguish between different sounds.

In one example, the processor 340 can also be used to filter ambient noise from desired signals (e.g., voice signals of another party, or the like) during a first mode or normal operation of system 100.

Exemplary Environment

Figure 4:
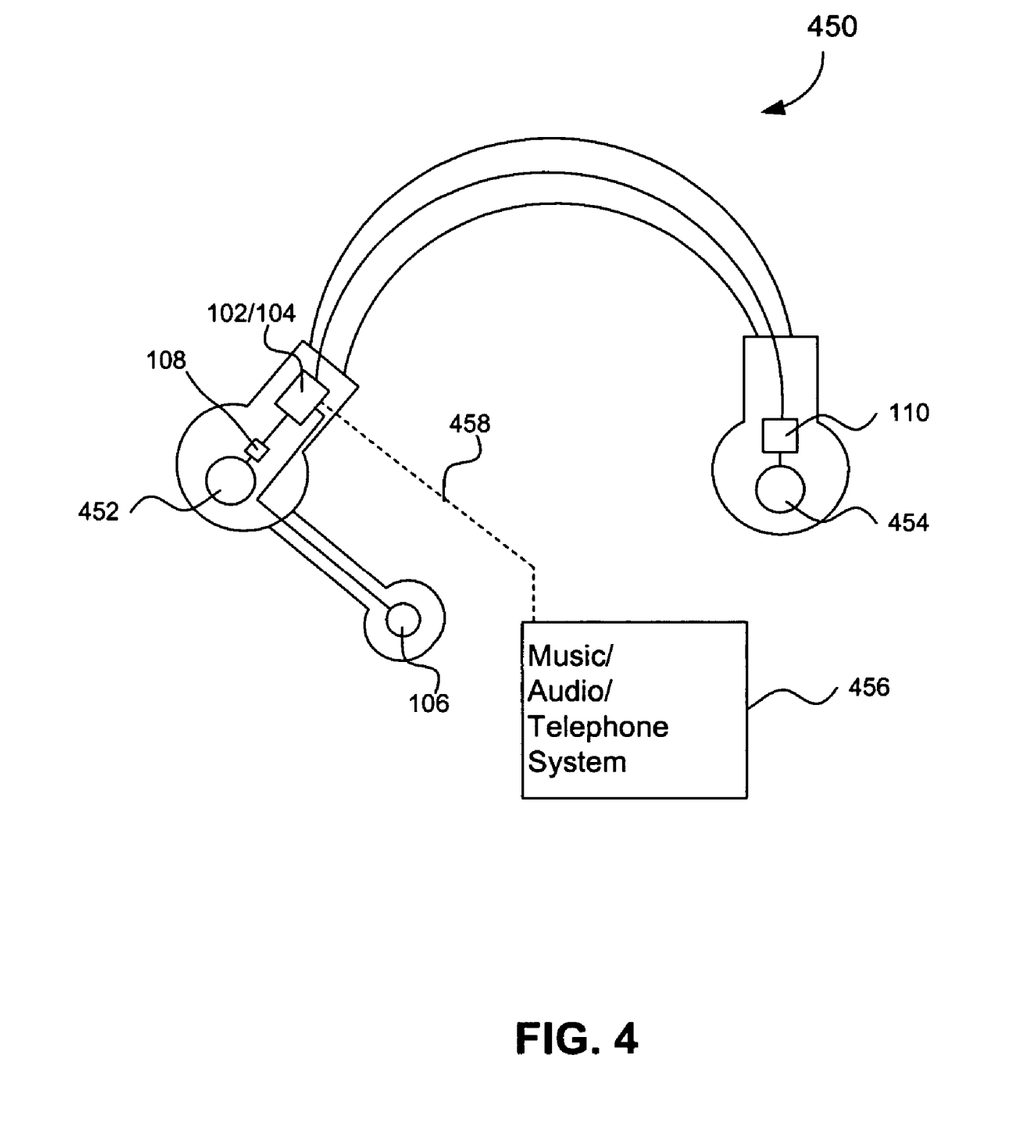
FIG. 4 shows an exemplary environment in which the system of FIG. 1 can be used, according to one embodiment the present invention.

FIG. 4 is an exemplary system 450 in which system 100 can be used, according to one embodiment of the present invention. For example, system 450 can be a pair of headphones including first and second earphone speakers 452 and 454, respectively, and can be coupled to a device 456 (e.g., a telephone, a music device, an audio device, or the like) via link 458, which can be a wired or wireless link. For example, the link can be, but is not limited to, a Bluetooth or radio frequency link. Device 456 can be a telephone, a storage system in an automobile, a portable system, or the like, that can also include at least the storage of firmware or software or both.

The first and second speakers 452 and 454 are respectively driven by first and second drivers 108 and 110 under control of analog system 102. In this embodiment, receiver 106 is a microphone used to talk into for telephone use of system 450. In one example, system 100 can be powered using the existing battery in system 450.

Thus, according to at least the above examples and embodiments of the present invention, safe use of headphones while also using a cellular telephone is provided by controlling whether earphones 452 and 454 receive the first information, e.g., default information, or second information, e.g., alert information.

Exemplary Operations

Figure 5:
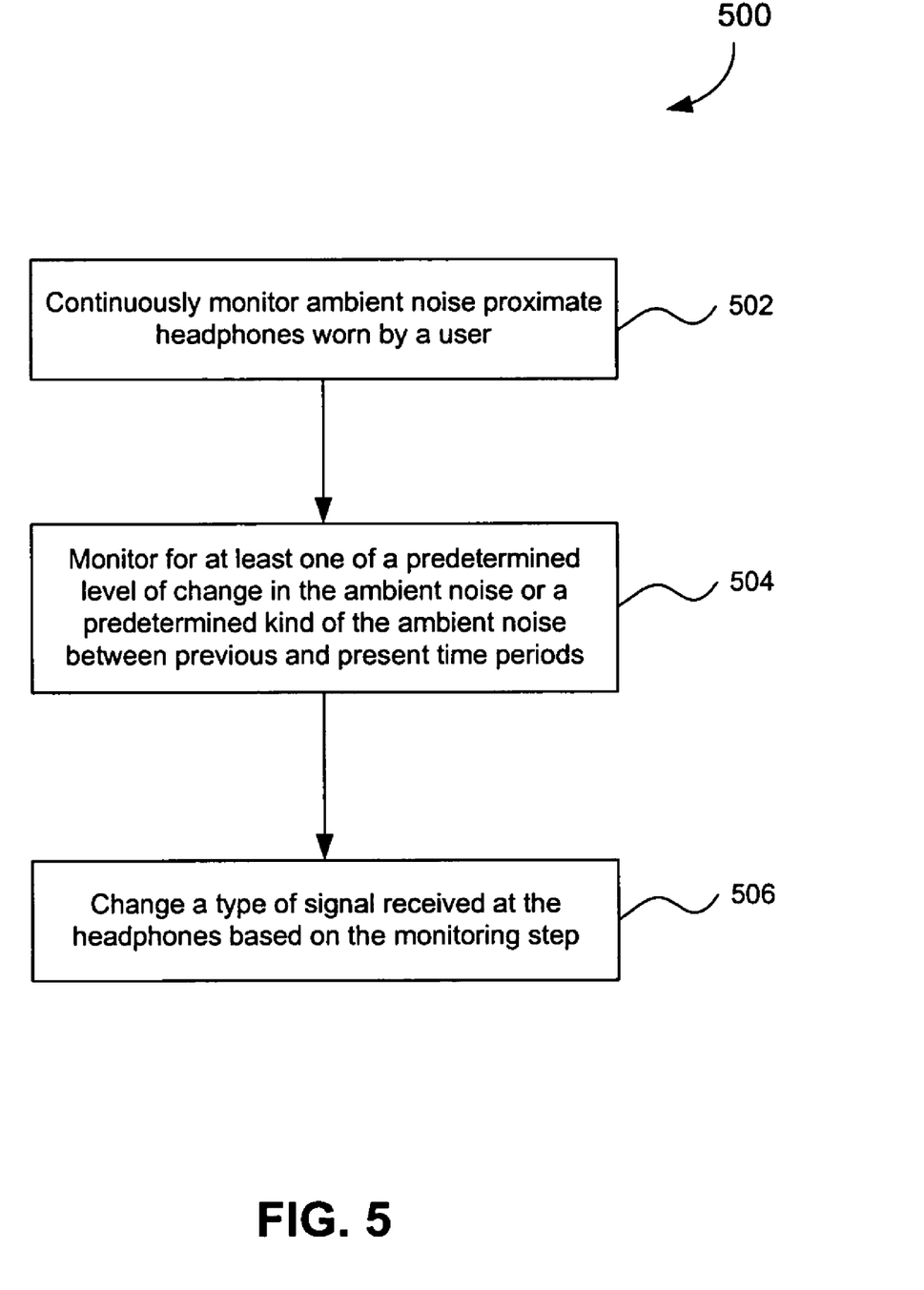
FIGS. 5 and 6 show flowcharts depicting various methods, according to various embodiments of the present invention.
Figure 6:
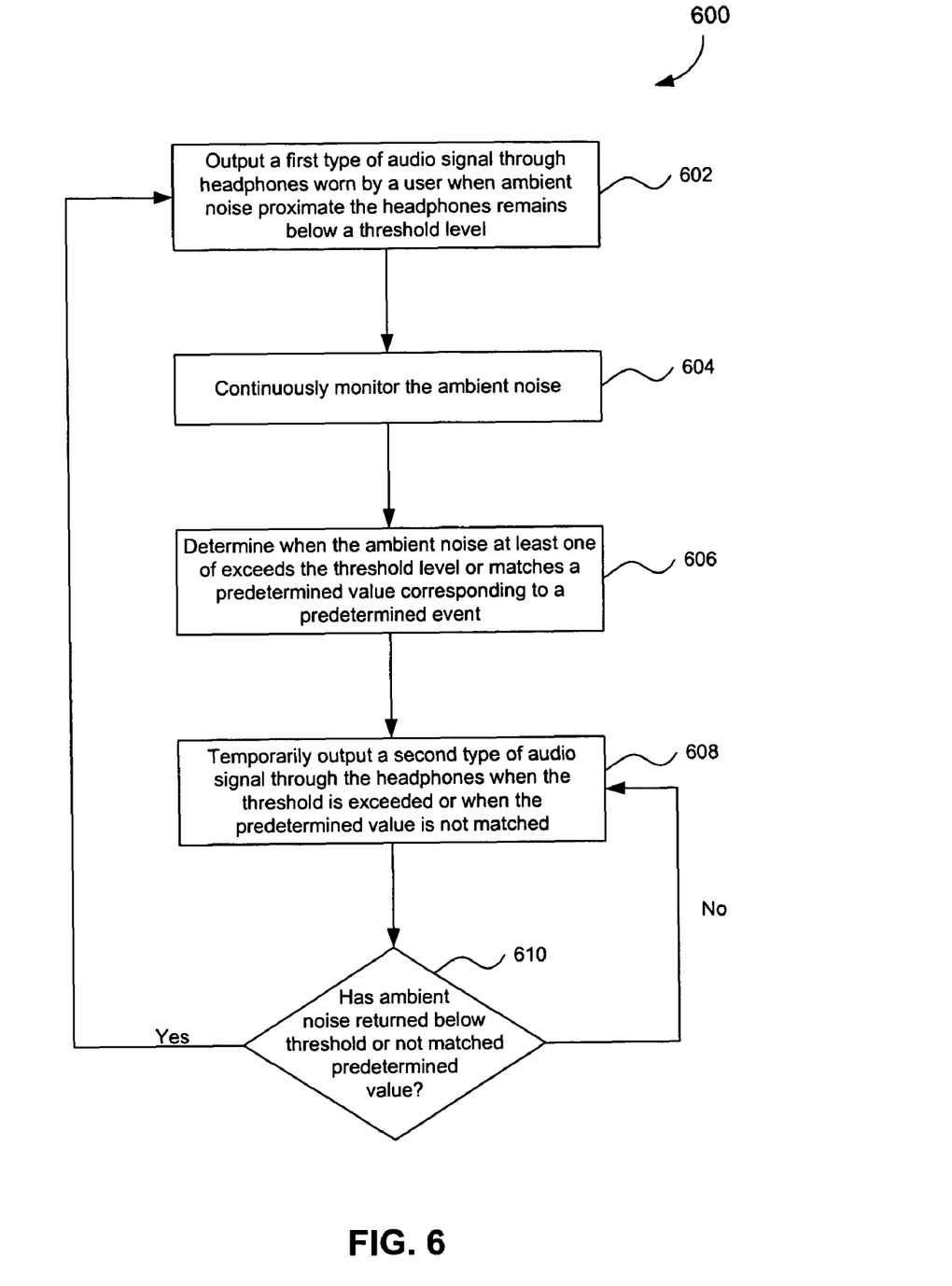

FIGS. 5 and 6 show flowcharts depicting methods 500 and 600, respectively, according to various embodiments of the present invention. Methods 500 and 600 can be practiced using one or more of the above embodiments and examples discussed above in reference to FIGS. 1-4.

Method 500 includes steps 502 to 506. In step 502, ambient noise proximate headphones worn by a user is continuously monitored. In step 504, at least one of a predetermine level of change in the ambient noise and/or a predetermined kind of the ambient noise between previous and present time periods is monitored. In step 506, a type of signal received at the headphones is changed based on the monitoring steps.

Method 600 includes steps 602 to 610. In step 602, a first type of audio signal is output through headphones worn by a user when ambient noise proximate the headphones remains below a threshold level. In step 604, the ambient noise is continuously monitored. In step 606, a determination is made as to when the ambient noise (a) exceeds the threshold level and/or (b) matches a predetermined value corresponding to a predetermined event. In step 608, a second type of audio signal is temporarily output through the headphones during either one or both of (a) the exceeding of the threshold or (b) the matching of the predetermined value. In step 610, a determination is made whether the ambient noise returns to below the threshold level or fails to match the predetermined value. If yes, the method 600 returns to step 602. If no, method 600 returns to step 608.

In one example, once the ambient noise returns to below the threshold level or fails to match the predetermined value, a user may have to press a control device (e.g., a button) (not shown) on either on the headphones or on the telephone or radio, etc., in order to move the process back to step 602. Thus, the user has to take an active step to return to listening to the first type of audio signal.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A system, comprising:
   a headphone comprising first and second speakers and a microphone, the microphone integrated in the headphone and located proximate the speakers and configured to receive successive first and second environmental audio information based on environmental conditions occurring proximate the microphone; and
   a monitoring system configured to compare a frequency of a first signal corresponding to the first environmental audio information received by the microphone with a frequency of a second, stored signal corresponding to the second environmental audio information previously received by the microphone, to determine if an event has occurred based on the comparison, to replace the second, stored signal with the first signal, and to generate a third signal based on the comparison,
   wherein the monitoring system is configured to control transmission of first information or second information through the speakers based on the third signal.

2. The system of claim 1, wherein:
   the first information is transmitted to the first and second speakers during a first mode and the second information is transmitted to the first and second speakers during a second mode;
   the first mode is a normal mode; and
   the second mode is an alert mode.

3. The system of claim 2, wherein the second mode is initiated if the system determines the event has occurred based on a change in at least one of frequency and decibel level of the first environmental audio information compared to the second environmental audio information.

4. The system of claim 1, wherein the monitoring system comprises a first system and a second system, the second system comprises:
   a storage device configured to store the signal corresponding to the second environmental audio information previously received by the microphone; and
   a processor configured to compare the frequency of the first signal with the frequency of the second, stored signal to generate the third signal.

5. The system of claim 4, wherein the processor comprises a digital signal processor.

6. The system of claim 1, wherein the speakers and the microphone are wirelessly coupled to a telephone via radio frequency transmissions.

7. The system of claim 1, wherein the speakers and the microphone are wirelessly coupled to a telephone via Bluetooth transmissions.

8. The system of claim 1, wherein:
   the first information is at least one of music, telephonic, audio recordings, and radio information; and
   the second information is alert information.

9. The system of claim 1, further comprising:
   a receiver,
   wherein the microphone is turned on when in use and is turned off when idle, and
   wherein the receiver is continuously on.

10. The system of claim 9, wherein the microphone uses more power than the receiver.

11. The system of claim 10, wherein the microphone uses about 10 times more power than the receiver.

12. The system of claim 1 further comprising:
    first and second drivers configured to drive the respective first and second speakers of the headphone.

13. A method, comprising:
    receiving, using a microphone that is integrated in headphones, first and second successive ambient noise signals proximate speakers of the headphones worn by a user;
    monitoring, using an analog or a digital electronic system, for a predetermined level of change in frequencies of the first and second successive ambient noise signals with respect to a frequency of a stored representation of the ambient noise, the stored representation of the ambient noise having been received by the microphone at previous time period;
replacing the stored representation of the ambient noise with one of the first or second successive ambient noise signals; and
changing, using the analog or the digital electronic system, a type of signal transmitted through the speakers to the user based on the monitoring.

14. A method, comprising:
outputting a first type of audio signal through speakers of headphones worn by a user when ambient noise, proximate the headphones and detected by a microphone, the microphone being integrated in the headphones and proximate the speakers, remains below a threshold level;
continuously monitoring the ambient noise;
determining when the ambient noise exceeds the threshold level by comparing a frequency of a representation of the ambient noise received by the microphone at present time period with a frequency of a stored representation of the ambient noise previously received by the microphone at previous time period;
replacing the stored representation of the ambient noise with the representation of the ambient noise received by the microphone at the present time period;
temporarily outputting a second type of audio signal through the headphones if the threshold is exceeded; and
returning to the outputting when the ambient noise returns to below the threshold level.

15. The method of claim 14, wherein the exceeding of the threshold signifies one of an emergency event or an event that requires attention of the user.

16. The method of claim 14, wherein:
the first type of audio signal comprises a telephone conversation being conducted by the user.

17. The method of claim 14, wherein:
the first type of audio signal comprises music being listened to by the user.

18. The method of claim 14, wherein the returning comprises the user interacting with a control device to return to the outputting.

19. A method, comprising:
outputting a first type of audio signal through speakers of headphones worn by a user if ambient noise, proximate the headphones and detected by a microphone, the microphone being integrated in the headphones and proximate the speakers, remains below a threshold level;
continuously monitoring the ambient noise;
comparing a frequency of a representation of the ambient noise received by the microphone at a present time period with a frequency of a stored representation of the ambient noise received by the microphone at previous time period;
replacing the stored representation of the ambient noise with the representation of the ambient noise received by the microphone at the present time period;
in response to the comparing, determining if change in the ambient noise matches a predetermined value;
temporarily outputting a second type of audio signal through the headphones if the predetermined value is matched; and
returning to the outputting if the ambient noise ceases matching the predetermined value.

20. The method of claim 19, wherein the matching of the predetermined value signifies one of an emergency event or an event that requires attention of the user.

21. The method of claim 19, wherein:
the first type of audio signal comprises a telephone conversation being conducted by the user.

22. The method of claim 19, wherein:
the first type of audio signal comprises music being listened to by the user.

23. The method of claim 19, wherein the returning comprises the user interacting with a control device to return to the outputting.

24. A system, comprising:
first and second drivers configured to drive respective first and second speakers of a headphone;
a microphone integrated in the headphone and located proximate the speakers, the microphone configured to receive speech of a user and first and second environmental audio information at first and second successive time periods;
a first system configured to receive a first signal corresponding to the environmental audio information of the first time period from the microphone; and
a second system configured to receive a second signal corresponding to the environmental audio information of the first time period from the first system, to compare a frequency of the second signal with a frequency of a stored signal corresponding to the environmental audio information of the second time period previously received by the microphone, to determine if an event has occurred based on the comparison, to replace the stored signal with the second signal, and generate a third signal based on the comparison,
wherein the first system controls transmission of first information or second information through the speakers based on the third signal being received from the second system.

* * * * *